3,247,158
FILLED PLASTISOL COMPOSITIONS
Harvey E. Alford, Amherst, and Franklin Veatch, Lyndhurst, Ohio, assignors to The Standard Oil Company, Cleveland, Ohio, a corporation of Ohio
No Drawing. Filed Feb. 7, 1962, Ser. No. 171,556
6 Claims. (Cl. 260—41)

This invention relates to vinyl plastisols and more particularly to an improved vinyl plastisol composition containing as a filler a mass of hollow discrete spheres of synthetic, fused, water-insoluble alkali metal silicate based glass.

It is an object of this invention to provide an improved vinyl plastisol composition having a relatively low viscosity per unit volume of filler and capable of containing a higher volume of an inert filler material than has heretofore been practical. It is a further object of this invention to provide an improved vinyl plastisol which yields lighter weight products than has normally been practical through the use of conventional plastisol technology. It is also an object of this invention to provide a filled plastisol composition which upon fabrication into final products yields a substantially higher tensile strength than conventionally filled plastisols. It is a further object of this invention to provide a means of utilizing plastisol techniques on a more economical basis through diminution in the amount of vinyl resin required per unit volume of plastisol composition.

All of these objects as well as many others can be achieved through the use as a filler in conventional vinyl plastisols of hollow glass spheres of the type disclosed in U.S. Patent No. 3,030,215. It has heretofore been found that there is a practical limitation on the volume of conventional fillers that may be added to vinyl plastisols. At filler to resin volume ratios much above 1:3, the viscosity of the vinyl plastisol becomes too great for conventional processing techniques to be employed. By means of this invention, it is now possible to significantly increase the amount of filler without achieving a concomitant increase in viscosity. It has now been found that filler contents as high as two or more times the volume of the resin can be employed without increasing the viscosity of the resultant plastisol above a workable level. Additionally, the products prepared from these hollow glass sphere-filled plastisols in accordance with conventional technology exhibit substantially greater tensile strength at the same or higher volume loadings than do products containing conventional fillers. As a further advantage, since the hollow glass spheres have a very low density, the final products produced in accordance with this invention will have a reduced density thus permitting the preparation of lighter weight products. The modulus of elasticity of products prepared from plastisols filled with the hollow glass spheres of this invention is substantially higher than that of comparable products derived from conventionally filled plastisols or even from unfilled plastisols.

The hollow glass spheres useful in this invention are of the type described in U.S. Patent No. 3,030,215 and can be characterized as being hollow discrete spheres of synthetic, fused, water-insoluble alkali metal silicate-based glass. These spheres have solid walls of approximately uniform density and clear, smooth, surfaces. They may be varied in size depending upon the size of the feed particles, the amount of gas-liberating agent, the temperature, etc. In general, the spheres will have a diameter within the range of 5 to 5000 microns and preferably 10 to 750 microns. Within the preferred range the average sphere diameter will usually be from about 75 to 200 microns. A typical mass of spheres for example, has particles within the size range of 10 to 350 microns with an average diameter of 100 microns.

The gas density of a mass of the spheres will vary to some extent with the density of the material from which they are formed, but to a larger extent with the ratio of the volume of the spheres to their wall thicknesses. Gas densities in the range of 0.1 to 0.75 grams per cubic centimeter have been achieved in accordance with the invention described in the parent application. For most purposes, lower densities are desirable and densities in the range of 0.25 to 0.45 are preferred. In the very low densities, the spheres tend to be more fragile because of the thinness of the walls. Within the preferred range, the spheres have adequate strength for most uses.

The wall thickness is very small. For instance, a sphere having a diameter of 350 microns and a gas density of 0.3 has a wall thickness of only 4 microns, which is only a little more than 1% of the diameter. In general, the wall thickness can be expressed as a percentage of the diameter of the spheres and will be about 0.5 to 10% thereof, preferably about 0.75 to 1.5% of the diameter in particles having a diameter of 10 to 500 microns.

As disclosed in U.S. Patent No. 3,030,215, the hollow spheres used in the composition of this invention can be made from an alkali metal silicate which has the formula $(Me_2O)_x:(SiO_2)_y$. Various alkali metal silicates within the range where $x$ is 1, $y$ is 0.5 to 5 and Me is an alkali metal such as sodium, potassium, or lithium, have been found satisfactory. One alkali or a mixture of several alkali metals can make up the alkali metal portion. Sodium silicate is the preferred material since it is a low cost raw material readily available from various commercial sources in sufficient purity and uniformity from batch to batch. A typical example of a commercial sodium silicate which can be used in the process has the formula $Na_2O \cdot (SiO_2)_{3.22}$. The alkali metal silicate will be referred to hereinafter as the basic feed material in the process. It is convenient to use it initially as an aqueous solution or slurry having a silicate content of 35 to 50 percent. The amount of water present is not critical since it is subsequently removed.

A silicate insolubilizing agent must be added to the basic feed material. Such insolubilizing agents render the hollow spheres more resistant to moisture. This agent can be selected from among the oxides of metals and metalloids, such as the oxides of zinc, aluminum, calcium, iron, boron, magnesium, or lead. Such oxide or oxides may be added directly to the feed material, or compounds which will be readily decompose under heat to yield the desired oxide may be incorporated with the feed material. The latter method can be acomplished by the addition of such metal salts as carbonates or bicarbonates, i.e., calcium carbonate or bicarbonate, nitrates, halides, sulfates, hydroxides, such as aluminum hydroxide. The metal component can also be in the negative radical, such as in borates such as borax and aluminates, such as potassium aluminate. In such case, the alkali metal in the silicate may be correspondingly reduced. The use of such oxides or oxide-forming compounds is well known in the glass and ceramics industry, and any standard text in this field explains their function and the properties they impart in forming a water-insoluble glass-like composition upon fusion of the same with an alkali metal silicate. The amount of silicate insolubilizing agent may vary depending on its composition and the degree of water desensitization required. The above texts explain this. Generally, the amount used will be from about 0.5 to 10% based on a 40% solution of sodium silicate. Boric acid and boric oxide are the preferred silicate insolubilizing agents in that they also appear to have the effect of lowering the required fusion temperature.

The composition containing the silicate and the insolubilizing agent should be so selected as to ingredients and proportions as to give a molten glass mixture having a high viscosity at a fairly low fusion temperature and a high surface tension. The word "glass" as used herein with reference to composition is intended to refer to the fusion product of an alkali metal silicate with an oxide, said product having in amorphous form, being insoluble in water and otherwise having the known properties of glass, although not necessarily being transparent. The silicate and the oxide are referred to herein as glass-forming ingredients.

In order to achieve spheres of very low density, it is necessary to add to the composition a compound or compounds which will liberate a gas at about the fusion temperature of the glass-forming composition. If the gas is liberated at too low a temperature, it is likely to be dissipated or become otherwise unavailable at the time when the particles fuse with the result that the particles will remain solid. On the other hand, if the gas is not liberated at or prior to the fusion temperature, the particles will also remain solid. The amount of gas liberating agent employed need not be large, generally from 0.1 to 5% by weight based upon the weight of the glass-forming ingredients can be used. An amount of 0.5 to 2% is usually preferred, depending upon the amount of gas capable of being liberated. Unduly large amounts of gas are to be avoided since they cause the expanding particles to burst with resultant collapse and fusion in the solid state. There are a large number of liquid and solid substances which can be used as gas liberating agents.

Typical of these substances are salts selected from the group consisting of carbonates, nitrates, nitrites, azides, carbamates, oxalates, formates, benzoates, sulfates, sulfites, and bicarbonates such as sodium bicarbonate, sodium carbonate, ammonium carbonate, sodium nitrate, sodium nitrite, ammonium chloride, ammonium carbamate, ammonium bicarbonate, sodium sulfite, calcium oxalate, magnesium oxalate, sodium formate, ammonium benzoate, ammonium nitrite, zinc sulfate, zinc carbonate, aluminum sulfate, and aluminum nitrate. Typical of organic compounds are urea, dimethylol urea, biuret, melamine, trinitrotoluene, mellitic acid, glycerin, aniline p-sulfonic acid, trimethyl glycine, adipic acid, aminoquinoline, nitroaminobenzoic acid, nitrobenzonitrile, 5-methylresorcinol, pentaglycerol, pyridine dicarboxylic acid, thiophene carboxylic acid, tetrabromoaniline, trihydroxyanthraquinone, and Carbowax 1000.

The three components of the feed composition can be intimately mixed by any known procedure and subdivided into small particles. For example, the three components can be suspended or dissolved in a suitable liquid, and thereafter thoroughly mixed, and after removal of the liquid, as by ashy evaporation, ground and if necessary, classified. The feed particle diameter can range in size from about 5 to about 2500 microns, although for economic reasons particles of a diameter not exceeding 500 microns ordinarily would be used. The economic limits of feed particle size depend largely upon the flexibility or range of operating conditions of the furnace used in the process. For any one particular batch it will be highly advantageous to use a feed of as narrow a particle size range that can economically be obtained. Otherwise widely varying sizes of particles will require such highly different heat requirements for conversion to hollow spheres that it will be much more difficult to find optimum operating conditions for the furnace. By use of a narrow range of feed particle sizes, a more uniform product can be obtained in higher yields. The specific particle size range to be used also will be determined in part by the ultimate properties desired.

It is preferred to introduce the particulate mixture comprising the basic feed material, the gas liberating agent, and the silicate-insolubilizing agent as a dry or substantially dry material which need not be completely anhydrous, in a heated zone where the particles can be suspended in a hot gas stream and there be caused to fuse and expand. Many types of equipment can be used at this stage including the furnace disclosed in Patent No. 2,978,338 which is based upon an application filed of even date with the application upon which Patent No. 2,978,340 issued. This furnace utilizes an updraft principle where the feed particles are introduced at or near the bottom of the furnace in an ascending column of hot gases. In such a furnace the particle settling rate in the gas is a balance of the buoyancy exerted on the particle by the upward velocity of the gas against the particle mass and volume or density. In this manner the particle receives heat in direct relationship to the requirements of heat necessary to fuse and expand it to a hollow sphere. This furnace permits the economical use of a feed of somewhat wider particle size range, than might otherwise be the case.

The main process variables for a furnace of this type are temperature and particle residence time. The temperature is selected in accordance with the fusion temperature of the feed mixture. This temperature must be sufficiently high to melt the solid particles but be maintained as low as possible to minimize costs and to facilitate process control. Temperatures within the range of 1000° to 2500° F. can be used, depending on the feed employed and residence time.

The particle residence time in the furnace becomes primarily a function of feed particle size and the total flow of gases through the furnace. Accordingly, the residence time for any given size apparatus may be adjusted to an optimum for the particular feed mixture and particle size range by varying the total flow of gases through the furnace. The operating conditions are adjusted so that the feed particles remain suspended in the hot region of the furnace for a time adequate to fuse and expand the particles to hollow spheres and are then carried upward in the ascending column of hot gases out of the high temperature zone of the furnace into levels of progressively lower temperatures so that the outer skin has time to substantially solidify without danger of rupture during product collection. The particles move out with the stream of gases into the cooler regions of the furnace to be collected either at the bottom of a chamber which surrounds the high temperature zone of the furnace, or the particles may remain in the ascending gases and pass overhead from the cooling zone in a separating zone where the particles are separated from the gases and collected. Residence times of 0.5 to 10 seconds are generally employed.

As indicated, the material entering the furnace is usually relatively dry. Generally it should not contain more than 20% by weight of moisture. Preferably it should contain about 3% or less of moisture by weight. The higher the water content, the greater the heat requirements in the fusing step. In addition, a lower moisture content will usually result in more satisfactory hollow spheres. The material can be dried by conventional methods, as for example, by heating in an air oven at a temperature well below its fusion temperature prior to introduction to the furnace.

EXAMPLE A

This example represents the method of producing the hollow spheres which are thereafter to be used in the composition of this invention. The feed composition was made by forming a slurry of a sodium silicate solution containing 40% sodium silicate $Na_2O \cdot (SiO_2)_{3.22}$ to which had been added 5.6% boric acid and 1% urea, based on the weight of the sodium silicate solution. The slurry was stirred until uniform and spread out in pans one inch thick and dried in an oven at a temperature of 580° F. for 16 hours. The dried material which had a moisture content of 3% was ground and classified by screening. All particles having a diameter of less than 250 microns were retained as feed material. These particles had an average diameter of 60 microns.

The feed materials was fed into a vertical tubular furnace having an updraft flow of the type described above at a rate of 2 pounds per hour in a furnace having a diameter of 10 inches and a height of 32 inches. The temperature within the furnace was 2000° F. and the average residence time of the particles was 2 seconds.

The particles were collected after their exit from the top of the furnace and were found to vary in size from 10 to 350 microns with an average diameter of 100 microns and a gas density of 0.30 gram/ml. The walls of the particles were clear and transparent and free from bubbles. All of the particles were hollow and uniform in appearance and varied only as to size within the above range.

The plastisols intended for use in this invention are conventional vinyl plastisols which are well known in the art. Essentially, a vinyl plastisol comprises a polyvinyl chloride resin suspended or dissolved in a plasticizer and optionally contains other ingredients such as stabilizers, fillers, wetting agents, gelling agents and the like. These vinyl plastisols are well known for use in conjunction with rotational and slush molding, spraying, knife and reverse roll coating, hot and cold dip coating, extrusions and chemically and mechanically blown foam. The conventional shaping techniques are applicable without change to the improved vinyl plastisols of this invention.

The resins used in preparing vinyl plastisols are generally emulsion grade polyvinyl chloride resins having molecular weights of more than about 10,000 and average particle sizes of less than about 10 microns. The term "polyvinyl chloride" as used herein is inclusive not only of polyvinyl chloride homopolymers of all types, but also of copolymers of vinyl chloride in a major proportion, such as copolymers of vinyl chloride and vinyl acetate, copolymers of vinyl chloride and vinylidene chloride, copolymers of vinyl chloride with maleic or fumaric acid esters, copolymers of vinyl chloride with styrene, and copolymers of vinyl chloride with acrylonitrile, as well as mixtures of polyvinyl chloride resins in a major proportion with a minor proportion of other synthetic resins, such as chlorinated polyethylene, or copolymers of acrylonitrile, butadiene and styrene.

The plasticizers which can be used in conjunction with the resin are basically of two different types, the solvating and non-solvating types. The solvating types tend to swell the resin and permit a more rapid fusion. The non-solvating types do not cause swelling and tend to cause slower fusion, but serve to render the plastisol more stable at room temperature. Any plasticizer conventionally employed in plastisol technology may be employed in this invention. Representative plasticizers include the phthalate esters such as butyl phenyl phthalate, di-2-ethylhexyl phthalate, dibutoxyethyl phthalate, capryl phthalate, octyl decyl phthalate, di-2-ethylhexyl tetrahydrophthalate, dicyclohexyl phthalate; the adipates such as butyl cellosolve adipate, dioctyl adipate, and di-2-ethylhexyl adipate which yield good low temperature properties; the phosphates which impart good flame resistance such as octyl diphenyl phosphate, triisooctyl phosphate, trioctyl phosphate, tricresyl phosphate, tributoxyethyl phosphate, cresyl diphenyl phosphate; the sebacates such as dioctyl sebacate; and the epoxy plasticizers which impart viscosity stability, good migration resistance and superior heat stability such as epoxidized soybean oil. Other conventionally used plasticizers such as butyl phthalyl, butyl glycolate and tetraethylene glycol diisohexoate can also be employed.

Optionally, stabilizers for the vinyl resin may be included in the plastisol composition. Metal salts of organic acids as well as other metallo-organic compounds can be employed for this purpose where desired. Such stabilizers are disclosed in U.S. Patents Nos. 2,564,646 and 2,716,042 to Leistner et al. Optionally, surface active agents are also added to the composition. Representative surface active agents include diethylene glycol monobutylether, polyalkylene glycol esters, dioctyl sodium sulphosuccinate, and lecithin.

Where any particular color is desired, pigments such as titanium dioxide can be utilized.

Conventional fillers may be employed in an auxiliary capacity if desired, in conjunction with the hollow glass spheres. If present at all, such fillers should be used in only minor proportions. Such conventional fillers include barium sulphate, calcium carbonate, diatomaceous earth, talc, clay, whiting, and dolomite.

Generally a plastisol will contain from about 35 to about 100 parts by weight of plasticizer per hundred parts by weight of resin, depending upon the particular plasticizer and the particular resin and the particular properties desired in the final product. Stabilizers, if used should be employed in relatively small amounts, for example, from about 0.1 to about 5 weight percent and likewise surface active agents, if employed, can be used in minor quantities in accordance with conventional procedures.

The hollow glass sphere fillers of this invention should be used in an amount from about 5 parts to about 300 parts by volume per 100 parts by volume of resin. On a weight basis, this corresponds approximately to about 1.5 to 100 parts by weight of hollow glass spheres per 100 parts by weight of the resin in the plastisol.

The method of formulating a plastisol containing the composition of this invention is in accordance with convention. A preferred method involves the use of a shear type mixer having a cooling jacket to prevent excessive buildup of heat which might cause premature solidification of the plastisol. In preferred method, the resin is added to the mixing apparatus first, after which a quantity of plasticizer is added slowly, with agitation. The filler is generally dispersed in the remainder of the plasticizer, and added to the mixture in that manner. Likewise, any additional compounding ingredients are generally dispersed in the plasticizer and added to the mixture. The components are mixed until the plastisol is homogeneous and a stable emulsion or dispersion formed. A mixing time of the order of one hour is generally satisfactory.

Optionally, the entire amount of plasticizer can be combined with the resin, and the additional fillers, stabilizers and the like would then be added as finely divided solids.

For many purposes, it is important that the plastisol be deaerated prior to the shaping operation. If this is to be done, it may be accomplished through the application of vacuum on a thin layer of plastisol or, on a larger scale, by mastication of the mixture on a three roll paint mill.

After the plastisol has been prepared, it can be shaped in accordance with conventional technology, as in any of the methods outlined, above, and thereafter subjected to a temperature sufficient to permit fusion of the resin. The required fusion temperature will depend upon the particular components of the plastisol and the thickness of the final article, but it is generally of the order of 350° F. Further details on plastisol technology may be found in standard references, including articles by E. G. Partridge et al., "Plastisols and Organosols—a Review of Their Composition, Characteristics and Application," Ruber Age, volume 67, page 553 (1960), W. D. Todd, "Vinyl Plastisol Compounding," Modern Plastics, page 111 (November 1949), and E. B. Greenspun, "Slush Molding Vinyl Plastisols," Modern Plastics, page 101 (October 1950).

*Example I*

A polyvinyl chloride plastisol composition was prepared in a shear type mixer from 100 parts by weight of an emulsion grade polyvinyl chloride homopolymer having an average particle size less than 74 microns and 90 parts by weight of dioctyl phthalate as a plasticizer. The polyvinyl chloride plastisol composition was then separated into three portions. To one portion 10 parts by volume of the hollow glass spheres prepared in accordance with Example A were added with agitation to 90 parts by volume of plastisol. To the second portion of the plastisol, 10 parts by volume of a conventional plastisol filler, "Surfex," a finely divided precipitated calcium carbonate, were added per 90 parts of plastisol. The third portion of the plastisol was retained as a control. Viscosity measurements were then made on the three plastisol formulations with results tabulated below in Table I.

TABLE I

| Sample (parts by volume) | A | B | C |
|---|---|---|---|
| Polyvinyl Chloride Plastisol | 90 | 90 | 90 |
| Hollow spheres filler | 10 | 0 | 0 |
| CaCO₃ filler | 0 | 10 | 0 |
| Plastisol viscosity at 25° C, poises | 200 | 412 | 186 |

The results of this example show a major advantage obtainable by means of this invention. The use of only 10 parts by volume of a conventional filler in Sample B resulted in an increase in the viscosity of the plastisol of over 120%. A like amount of hollow glass spheres in Sample A caused only a negligible increase in the viscosity of the plastisol, less than 8%. Thus, by changing from a conventional filler to the hollow glass spheres employed in this invention, one can achieve a very significant decrease in viscosity of the plastisol. The lower the viscosity of the plastisol, the more economical are the subsequent processing steps.

The three plastisol compositions were each poured into a mold having a cavity measuring six inches by six inches by one half inch and heated at a temperature of 350° F. for one hour to obtain a solid product. The tensile strength and modulus of elasticity of each of the solid products were determined and are reported below in Table II.

TABLE II

| Sample (parts by volume) | A | B | C |
|---|---|---|---|
| Polyvinyl Chloride Plastisol | 90 | 90 | 90 |
| Hollow spheres filler | 10 | 0 | 0 |
| CaCO₃ filler | 0 | 10 | 0 |
| Tensile strength, p.s.i. | 409 | 208 | 410 |
| Modulus of elasticity, p.s.i. | 1,430 | | 930 |
| Density, p.s.i. | 1.03 | 1.27 | 1.20 |

These results show that the tensile strength of a plastic product made from a conventionally filled plastisol, Sample B, drops off very sharply when even a relatively small volume of filler is employed. By contrast, there is essentially no decrease in tensile strength in the final product where the plastisol contained a like volume of hollow spheres in accordance with this invention as in Sample A. This property is further enhanced by the fact that the weight per unit volume of Sample A is about 14% less than that of Sample C, the sample made from an unfilled plastisol. By contrast, Sample B, made from a conventionally filled plastisol, showed a slightly higher density than did Sample C. This invention therefore permits the manufacture of lighter weight but stronger products than do the methods of the prior art. The modulus of elasticity of the sample prepared by means of this invention was substantially higher than that of the sample made from the unfilled plastisol.

*Example II*

The procedure of Example I was repeated, using varying compositions of polyvinyl chloride resin and fillers, as noted in Table III. Results of viscosity tests are reported in Table III.

TABLE III

| Sample (Parts by volume) | D | E | F | G | H | I | J | K | L | M | N |
|---|---|---|---|---|---|---|---|---|---|---|---|
| Polyvinyl chloride plastisol | 100 | 90 | 77.5 | 56.9 | 48.6 | 30.0 | 95.4 | 90 | 85 | 80.6 | 74 |
| Hollow filler | 0 | 10 | 22.5 | 43.1 | 51.4 | 70.0 | 0 | 0 | 0 | 0 | 0 |
| CaCO₃ filler | 0 | 0 | 0 | 0 | 0 | 0 | 4.4 | 10 | 15 | 19.4 | 26 |
| Plastisol viscosity, poises | 186 | 200 | 360 | 577 | 1,810 | 3,100 | 301 | 412 | 685 | 1,348 | 3,850 |

The results of this example indicate that considerably more filler may be added to a plastisol by means of this invention than has heretofore been possible. A viscosity of about 3000 poises is about the highest that can be permitted in conventional plastisol technology. Viscosities above this level indicate that the plastisol is in a semi-solid state and not susceptible to processing as a plastisol. Samples E through I indicate that the plastisols of this invention retain their workability even at very high filler to resin loadings. Thus, Sample I which is just about at the borderline of workability, contains 70 parts by volume of hollow glass spheres to only 30 parts by volume of resin. Sample H, clearly within the range of workability, contains about half resin and half hollow glass spheres. In sharp contrast, Sample N, which contains 74 parts of resin and only 26 parts of a conventional filler, is clearly unworkable. Sample F which has a volume loading of hollow glass spheres approximating that of the calcium carbonate content of Sample N exhibits a viscosity of about one tenth that of Sample N.

These examples therefore show that this invention provides a means of increasing the filler content of a plastisol composition and a means for decreasing the viscosity of a plastisol at a given filler content.

*Example III*

A plastisol composition was prepared in accordance with Example I and various fillers were added thereto and solid products produced in accordance with the procedure of Example I. Compositions and test results are indicated in Table IV.

TABLE IV

| Sample (Parts by volume) | O | P | Q | R | S | T |
|---|---|---|---|---|---|---|
| Polyvinyl chloride plastisol | 100 | 90 | 75 | 50 | 90 | 75 |
| Hollow spheres | 0 | 10 | 25 | 50 | 0 | 0 |
| CaCO₃ filler | 0 | 0 | 0 | 0 | 10 | 25 |
| Tensile strength, p.s.i. | 410 | 409 | 382 | 173 | 208 | 181 |
| Modulus of elasticity, p.s.i. | 930 | 1,430 | 1,110 | 1,230 | | 687 |
| Density, gm./cc. | 1.20 | 1.03 | 0.94 | 0.71 | 1.27 | 1.40 |

These examples show that the tensile strength of hollow glass sphere-filled plastisol products drops off much less sharply with increased filler loading than is the case with conventionally filled plastisols. A low hollow sphere loadings, there is essentially no decrease in tensile strength. The modulus of elasticity of hollow sphere filled plastisol products is higher than that of unfilled plastisols, even at high hollow sphere loadings, whereas the modulus of elasticity of conventionally filled plastisol products is lower than that of the unfilled products. The density of hollow sphere filled products decreases as the loading increases whereas the use of the conventional fillers leads to an increase in density of the final product.

*Example IV*

The procedure of Example I was repeated using as the resin a copolymer containing 96% of vinyl chloride and 4% of vinyl acetate. The viscosity of the plastisol filled with hollow spheres was significantly lower than the plastisol filled with a comparable volume of "Surfex" filler indicating that this invention is applicable to copolymers of vinyl chloride.

We claim:

1. A fluid dispersion having a relatively low viscosity per unit volume of filler comprising an emulsion grade polyvinyl chloride resin, from about 35 to about 100 parts by weight per 100 parts by weight resin of a liquid plasticizer therefor and, as a filler, from about 1.5 to about 100 parts by weight per 100 parts by weight of the resin of hollow, discrete spheres of synthetic, fused, water-insoluble alkali metal silicate-based glass, said hollow spheres having solid walls of the same density throughout, and clear, smooth surfaces, diameters of from 5 to 5000 microns and wall thicknesses of from 0.5 to 10% of their diameters, a mass of said spheres having a gas density of 0.1 to 0.75 grams per cubic centimeter.

2. A composition as in claim 1 wherein the said emulsion grade polyvinyl chloride resin is a homopolymer of vinyl chloride.

3. A composition as in claim 1 wherein the said hollow spheres are further characterized as having diameters of from 10 to 500 microns, an average diameter of from 75 to 150 microns, an average wall thickness of about 0.75% to 1.5% of their diameters, a mass of said spheres having a gas density of 0.25 to 0.45 grams per cubic centimeter.

4. A method of reducing the viscosity of a filler-containing fluid dispersion of an emulsion grade polyvinyl chloride resin in a liquid plasticizer therefor while increasing the modulus of elasticity and reducing the density of articles fabricated therefrom, comprising incorporating in said dispersion a filler comprising from about 1.5 to about 100 parts by weight per 100 parts by weight of the resin of hollow, discrete spheres of synthetic, fused, water-insoluble alkali metal silicate-based glass, said hollow spheres having solid walls of the same density throughout, and clear, smooth surfaces, diameters of from 5 to 5000 microns and wall thicknesses of from 0.5 to 10% of their diameters, a mass of said spheres having a gas density of 0.1 to 0.75 grams per cubic centimeter and mixing until a homogeneous dispersion is formed.

5. A method as in claim 4 wherein the said emulsion grade polyvinyl chloride resin is a homopolymer of vinyl chloride.

6. A method as in claim 4 wherein the said hollow spheres are further characterized as having diameters of from 10 to 500 microns, an average diameter of from 75 to 150 microns, an average wall thickness of about 0.75% to 1.5% of their diameters, a mass of said spheres having a gas density of 0.25 to 0.45 grams per cubic centimeter.

References Cited by the Examiner

UNITED STATES PATENTS 3,030,215   4/1962   Veatch et al. _____ 106—40

FOREIGN PATENTS 594,400   3/1960   Canada.

OTHER REFERENCES

Doolittle: Technology of Solvents and Plasticizers, John Wiley and Sons, New York, 1954, pages 177–183.

MORRIS LIEBMAN, *Primary Examiner.*